United States Patent [19]

Haueter et al.

[11] Patent Number: 4,958,443
[45] Date of Patent: Sep. 25, 1990

[54] METHOD AND APPARATUS FOR TREATING BULK MATERIAL

[76] Inventors: Walter Haueter, Kirchstrasse 8, 9532 Rickenbach; Hans-Ulrich Pfaffhauser, Sonnenbergstrasse 16, 9524 Zuzwil; Karl Benz, In der Breiti 28, 9244 Niederuzwil, all of Switzerland

[21] Appl. No.: 317,183

[22] Filed: Feb. 28, 1989

[30] Foreign Application Priority Data

Mar. 12, 1988 [DE] Fed. Rep. of Germany ....... 3808282

[51] Int. Cl.⁵ .............................................. F26B 17/00
[52] U.S. Cl. ..................................... 34/57 D; 34/130; 34/57 R
[58] Field of Search ............ 34/10, 57 A, 57 R, 57 C, 34/57 D, 57 E, 130, 131, 133

[56] References Cited

U.S. PATENT DOCUMENTS

| | | | |
|---|---|---|---|
| 3,169,381 | 2/1965 | Persson | 62/57 |
| 3,691,644 | 9/1972 | Schnitzer | 34/10 |

FOREIGN PATENT DOCUMENTS

| | | | |
|---|---|---|---|
| 63486 | 3/1985 | European Pat. Off. | 34/57 R |
| 2531390 | 12/1981 | Fed. Rep. of Germany | 34/57 R |
| 888387 | 12/1943 | France | 34/57 R |
| 1399837 | 5/1965 | France | 34/57 R |
| 512118 | 1/1955 | Italy | 34/57 R |

*Primary Examiner*—Henry A. Bennet
*Attorney, Agent, or Firm*—Martin A. Farber

[57] ABSTRACT

For the uniform treatment of bulk material by means of a gas the bulk material is fluidized in a rotating container (101) in order to be mixed by the rotation thereof. In the case of heating the bulk material the rotation of the container is expediently interrupted at periodic intervals. A transport device is preferably provided in the interior of this container, in particular in the form of a worm or screw flight (20) of irregular pitch—related to one rotation in order to be able to precisely determine the dwell time through the mechanical transport. This screw (20) is preferably constructed as a two-start screw (FIG. 6).

41 Claims, 9 Drawing Sheets

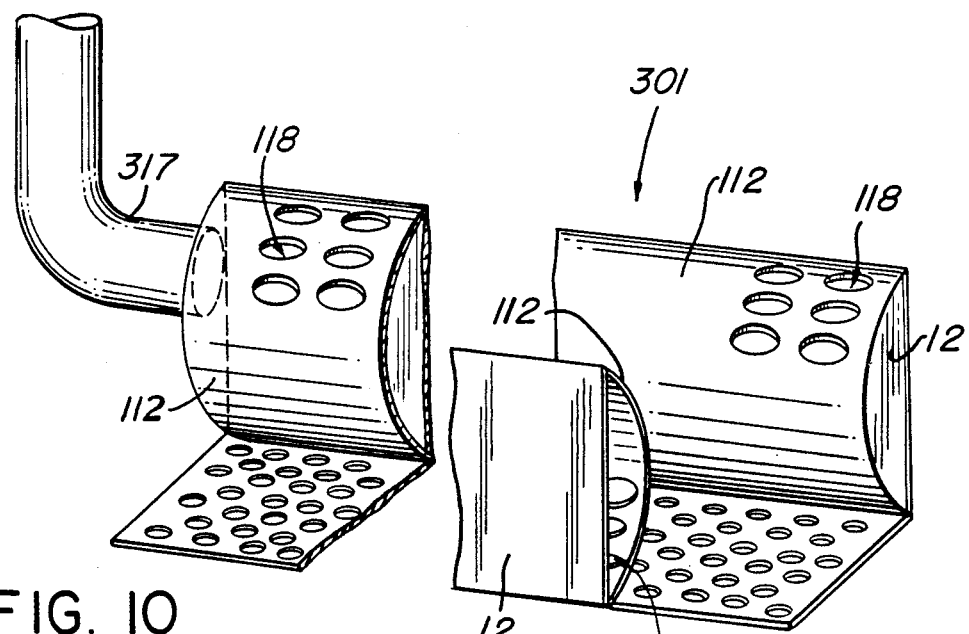
FIG. 10
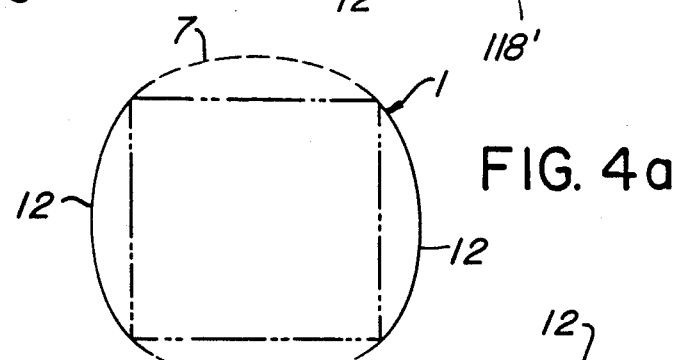
FIG. 4a
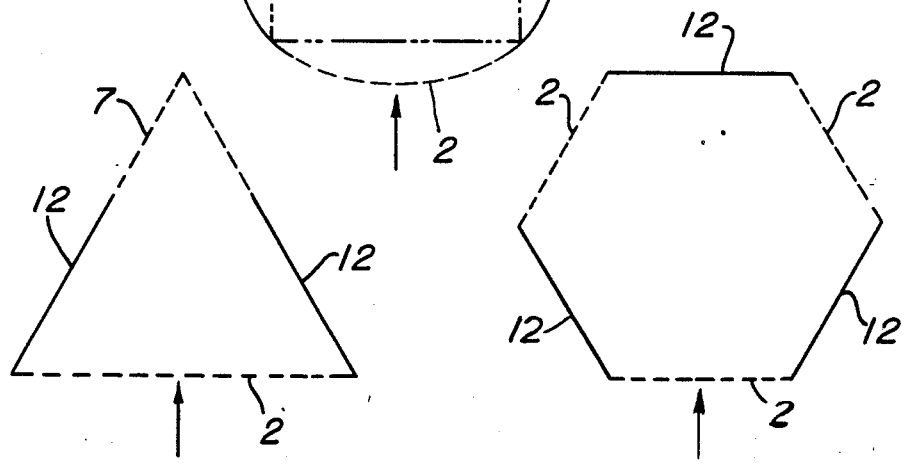
FIG. 4b
FIG. 4c

METHOD AND APPARATUS FOR TREATING BULK MATERIAL

The invention relates to a method and apparatus for treating bulk material by means of a gas wherein the latter flows through the at least partially perforated jacket wall of a container rotating about an axis with the bulk material to be treated having been introduced into the container.

Such methods are generally used for the drying of bulk materials and indeed in particular for short pieces of dough such as can be seen for example from German patent specification 693 641, from French patent specification 888 387 or from the Italien patent specifications 427 072 and 512 118. In all these methods the containers are rotated about an axis of rotation lying eccentric to their geometrical longitudinal axis, i.e. the individual containers lie at the periphery of a drum driven about the axis of rotation. The individual containers are thereby either equipped with a co-rotating transport means in its interior or are set out for batch operation without such a transport means. Since the drying process is intended to be a gentle drying process the treatment gas, generally air, is guided at a relatively low speed through the container.

Fluidized bed processes are in comparison a substantially more complicated matter with a relatively high air speed initially standing at the forefront. This air speed which is higher than in the drying processes discussed earlier may be lower in individual fluidised beds than in others and with extremely low air speeds the literature talks of a "bubble bed". Inert gas has also already been proposed as a gas for fluidisation.

Now, it is the purpose of a fluidized bed to bring the individual particles of the bulk material being treated into intimate contact with the treatment gas on all sides. For this purpose the low air speeds of a "bubble bed" would in fact be sufficient. The problem however lies in the fact that these known fluidised beds tend to form gas passages in which the resistance for the gas is then somewhat lower, and the treatment gas then flows through these passages without flowing around the particles of bulk material in the desired manner.

One has therefore already proposed various mixing devices within a fluidised bed. Examples for this can for example be found in FR-PS 1 399 837 or in US-PS 3 169 381. Of course such mechanical mixing means are associated with the disadvantage that they introduce undesirably large frictional forces into the bulk material which can lead to a comminution of the particles of bulk material. Moreover, not inconsiderable amounts of energy are required for such mixing devices. Finally, the stirring arms of such mixing devices ultimately also present a cleaning problem.

In accordance with numerous other proposals (one example of which is DE-PS 25 31 390) the floor of the fluidised bed is provided with at least one inclined surface. The treatment gas flows at an elevated speed through this inclined surface in order to ensure an eddying and thus a mixing of the particles of the bulk material. This has however two consequences. On the one hand, the energy requirement both for the transport of the gas and also for its heating is substantially increased, on the other hand, the mixing function is chained to the treatment parameters, i.e. a change of the treatment parameters which leads to a change of the flow speed is no longer straightforwardly possible.

In order therefore, to be able to operate at lower air speeds, (i.e. with a bubble bed) it has been proposed in accordance with EP-OS 634 86 to decouple the treatment parameters from the mixing function. For this purpose the eddying effect is generated through an inclined (cylindrical) sieve floor together with a vibrational movement. Since however the sieve floor has a certain stiffness as a result of its cylindrical shape—which was also required by the screw transporter used coaxially with this cylinder, the entire fluidised bed housing must also be vibrated, indeed together with the screw drive. Considerable forces are required to vibrate the relatively heavy housing without thereby achieving any additional effect on the bulk material. Such vibrations cannot be employed without reservation when the apparatus is erected in a building. So far as vibration of the bulk material is concerned vibration of the sieve alone would however have been sufficient.

The present invention is thus based on the object of providing a fluidised bed process and apparatus in which the treatment parameters (temperature, flow speed, material to be treated and treatment gas) can be selected independently of the mixing process, but in which the mixing process can be achieved with a relatively low expense, and in this way to achieve uniform treatment action in a gentle manner.

The invention starts from the recognition that this object can be solved by a method of the initially named kind which is characterised the bulk material is fluidised in the rotating container with the aid of the gas.

If the fluidization is now interrupted at periodic intervals then better mixing is achieved on the one hand and also a saving of treatment energy, on the other hand, since no thermal energy is absorbed by the bulk material during the interruptions.

This principle can indeed be expoited independently of fluidisation in order to obtain energy saving, if the heating is interrupted at periodic intervals and the bulk material is left to the action of the thermal energy stored in it during the heating periods; and if at least three heating periods and intermediate interruptions are provided.

The method of the invention is suitable for basically all fluidized bed treatments in which it is mainly physical and/or chemical changes which are to be achieved with the material being treated.

For carry out a chemical treatment, which is a preferred application of the presently proposed method, the temperature of the treatment medium is preferably selected to lie above 110° C. and indeed expediently lies above 150° C. The temperature should however not exceed a maximum of 450° C. and preferably lies in the range from 160° C. to 420° C.

A preferred apparatus for carrying out the method of the invention comprises a container having an at least partially perforated jacket wall and rotatable by means of a drive around an axle and also gas supply and extraction means, with this apparatus being characterised in that the gas supply and discharge means is dimensioned with respect to the pressure or speed of flow to be imparted to the gas such that fluidisation of the bulk material takes place in the container. An apparatus of this kind can in principle be formed in known manner as a rotating drum with containers arranged eccentrically to the axis of rotation. However, a higher degree of efficiency and a more uniform treatment results if the axis of rotation of the fluidization container coincides with its geometrical axis.

In a particularly preferred embodiment a transport means for the bulk material is provided in the interior of the rotating fluidisation container and is in particular formed as a co-rotating worm screw in manner known per se, so that the dwell time can be precisely determined in a continuously operating fluidised bed in accordance with the invention. The use of a co-rotating worm screw avoids the danger which arises when using movable parts, such as the mechanical mixing devices discussed above, which move relative to the walls of the fluidised bed apparatus in the interior of the latter.

In this respect the expression "worm screw" should be understood in the most general sense and also includes for example constructions such as are known per se in dryers for dough products in which the screw has an irregular pitch over each turn, with compartments for the bulk material being formed by sections with a pitch angle of at least approximately 0°, whereas sections with a larger pitch angle are provided for the further transport into the next compartment.

Irrespective of how the position of the rotational axis is chosen in relation to the geometrical axis of the container, and independently of any fluidisation which occurs, a variant of the above construction in which the screw is formed as a two start or multi-start screw is of advantage, since different products can then be treated in different turns of the screw. During the rotation of the container about its axis of rotation the walls formed by the flights of the screw which define the compartments always lie at the same position as will be made clear later with respect to the specific description.

It has already been emphasized that a substantial aspect of the present invention is the object of carrying out a treatment uniformly, so that a uniform product results. One determining factor in this respect lies in achieving thorough and careful mixing which can readily be achieved by the methods and apparatus of the invention disclosed herein. On the other hand, it has been found that the moisture content of the bulk material being treated is a particularly important parameter so far as thermal treatments are concerned, since with non-uniform moisture content part of the thermal energy supplied is lost in vaporising the moisture.

In a plant including the apparatus of the invention it has been found to be advantageous for a conditioning means to be inserted before the rotating container in order to render the water content of the bulk material particles more uniform.

It is known per se that microwaves act selectively on the water content of a substance and excite this water content into oscillations which heat the substance up. It has however been shown in practice that microwave treatments always lead, with non-uniform moisture content, to a non-uniform result. For this reason microwaves would not appear suitable for conditioning purposes. It has however been surprisingly found that a conditioning means formed by combining a gas supply means with a microwave generator for generating a microwave field within a region of the gas flow leads to a particularly uniform moisture content, since the moisture driven out by the microwaves is in part rapidly transported away by the gas flow and in part redistributed thereby, resulting in end-effect in the desired uniform state.

Further particulars of the invention can be seen with reference to the following descriptions of embodiments as shown in the drawings in which:

FIG. 3 shows a cross-section of the apparatus of FIG. 2 in one position of the rotor, whereas

Figure 1:
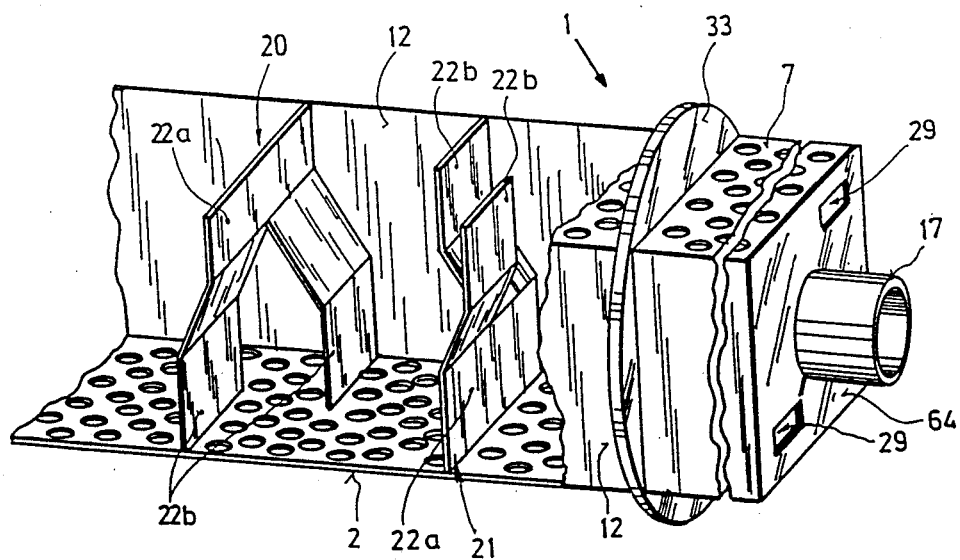
FIG. 1 shows a partly broken away rotor as used in an apparatus in accordance with FIGS. 2 and 3 with two kinds of intermediate walls being inserted into the rotor to form a two-start worm of irregular pitch over one rotation; with FIG. 1a explaining the interengagement of the wall elements shown in FIG. 1 to form the two-start worm of irregular pitch.
Figure 2:
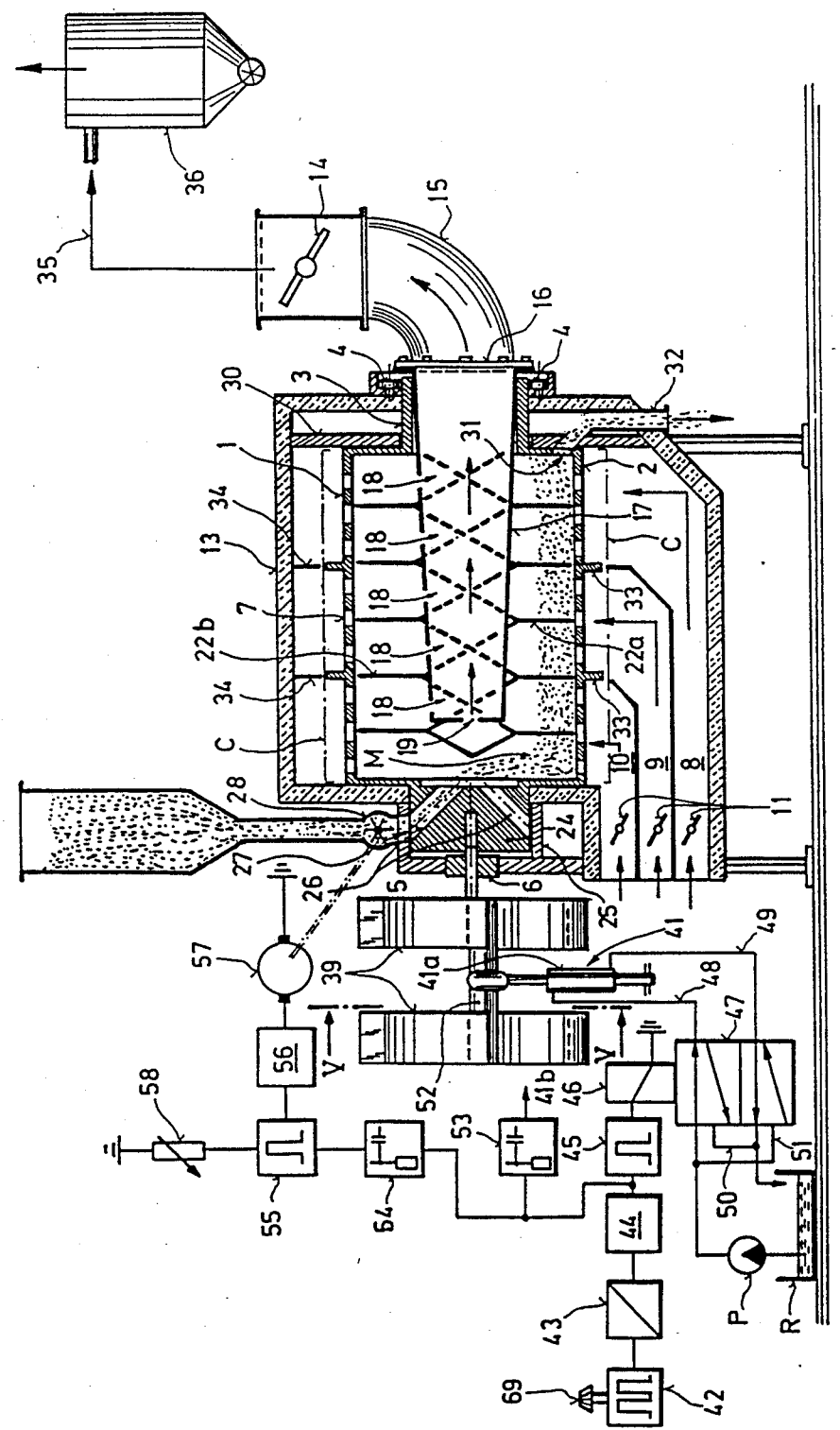
FIG. 2 shows a longitudinal section through a preferred embodiment of an apparatus in accordance with the invention.
Figure 3:
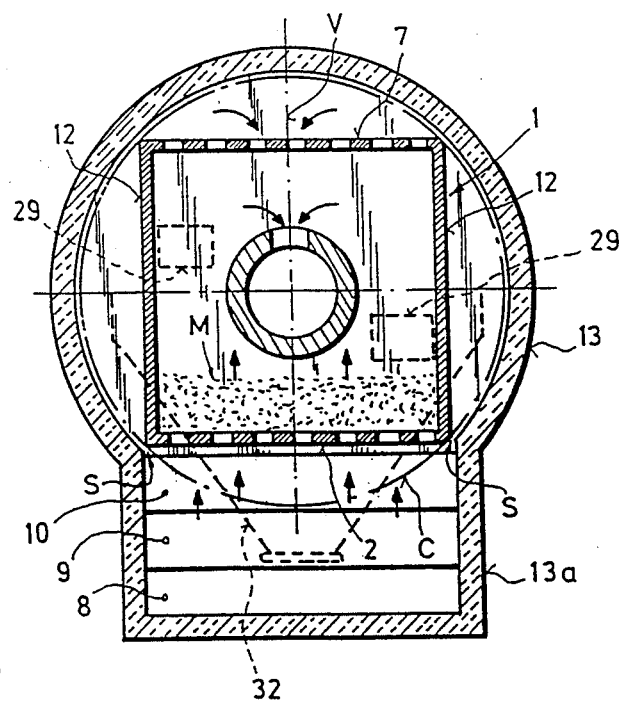
Figure 5:
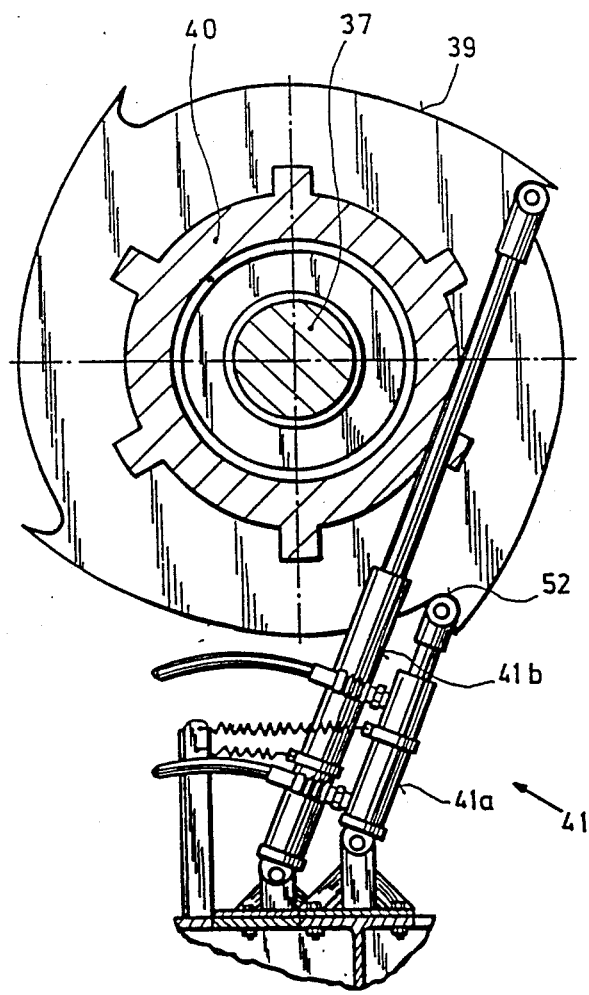
Figure 7:
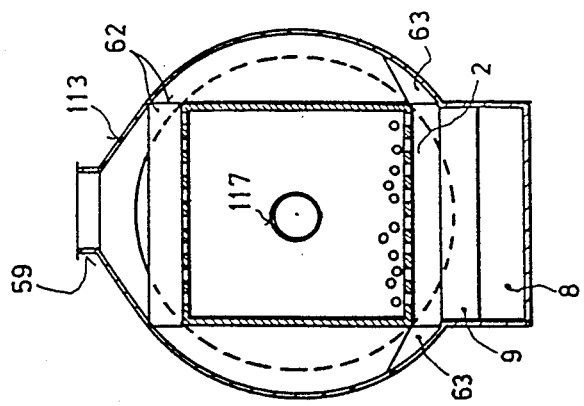
Figure 6:
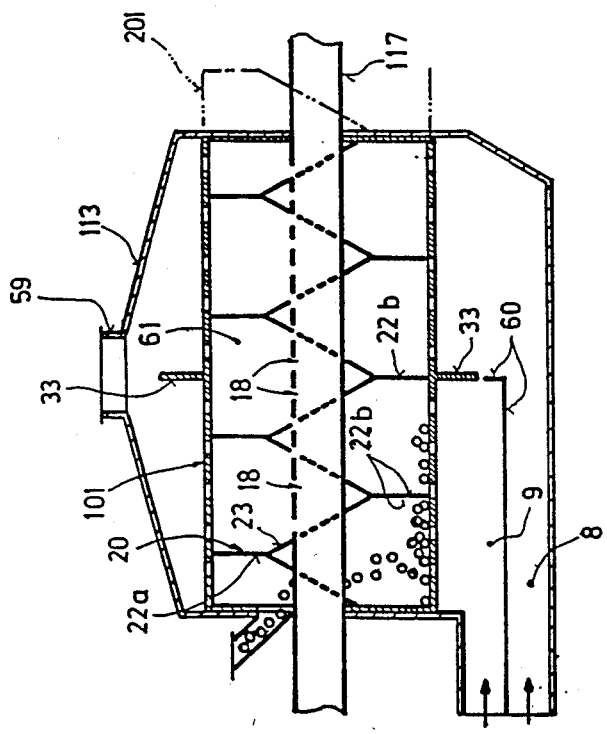
Figure 8:
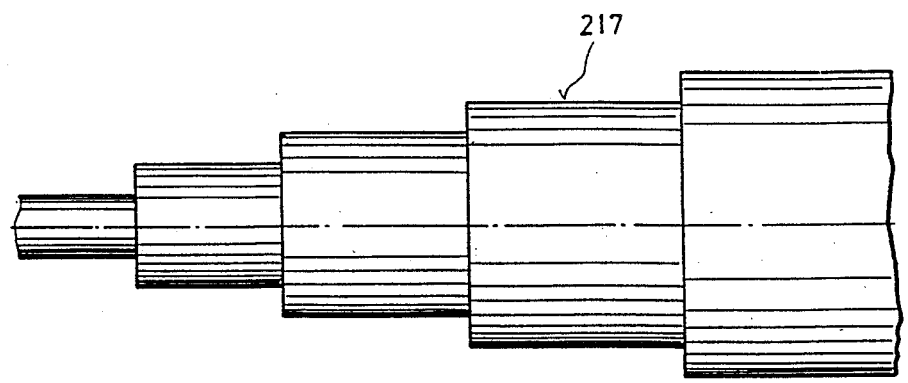
Figure 9:
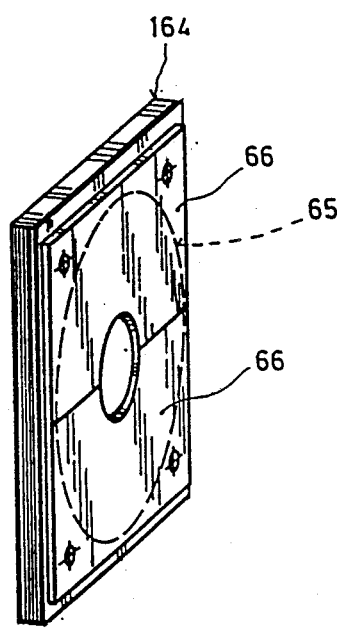
Figure 11:
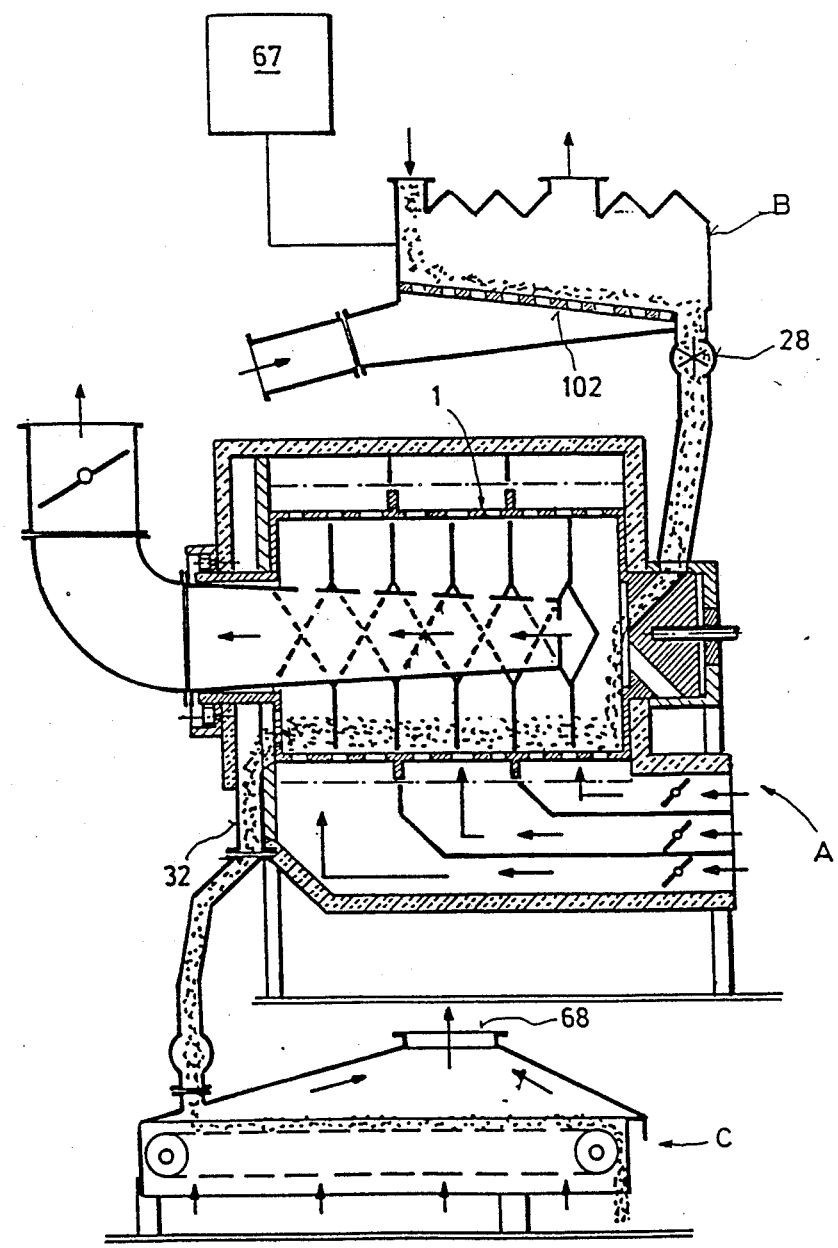

FIG. 4, comprising FIGS. 4a, 4b and 4c, shows various alternative cross-sectional shapes for a rotor, FIG. 4a showing a quadratic cross-section, FIG. 4b showing a triangular cross-section and FIG. 4c showing a hexagonal cross-section;

FIG. 5 shows a cross-section through the drive shaft for the rotor with a preferred embodiment of a rotor drive;

FIGS. 6 and 7 show an alternative embodiment to FIGS. 2 and 3, with the rotor having only a one-start worm of irregular pitch and rotating about an axle or a tube of uniform diameter to facilitate a modular assembly;

FIG. 8 shows a stepped central tube whereby the advantages of the tubes shown in FIGS. 2 and 6 can be jointly obtained;

FIG. 9 shows a possible embodiment of an end wall of a rotor when forming a central tube in accordance with FIG. 2 or FIG. 8;

FIG. 10 shows an alternative solution for the conveying away of the treatment gas, with the broken away rotor walls being shown in a representation similar to that of FIG. 1;

FIG. 11 shows a plant with an apparatus in accordance with the invention; and

Figure 13:
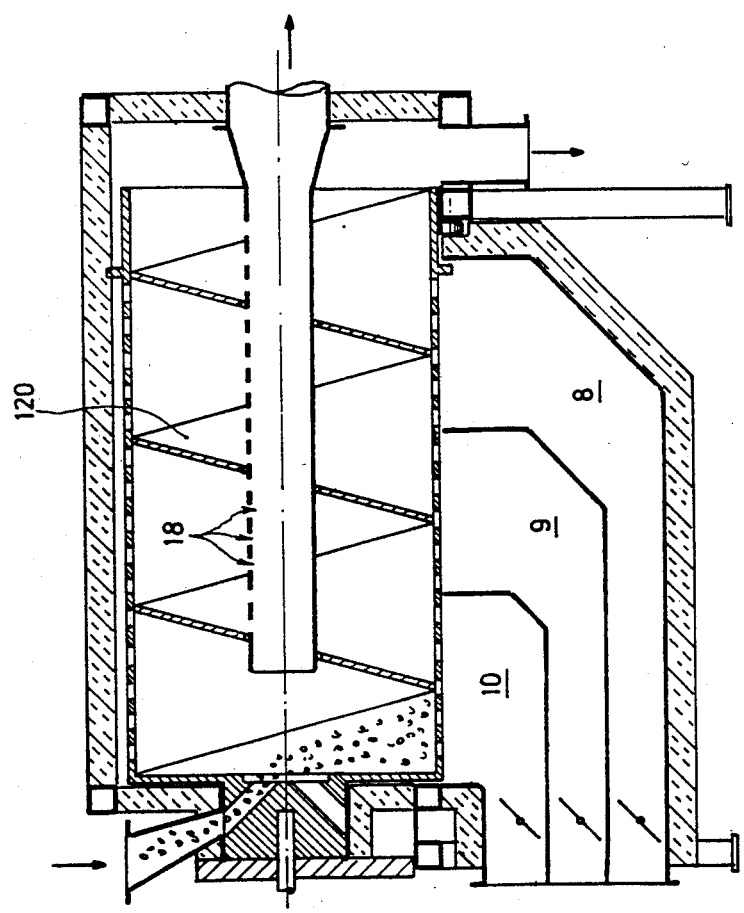
Figure 12:
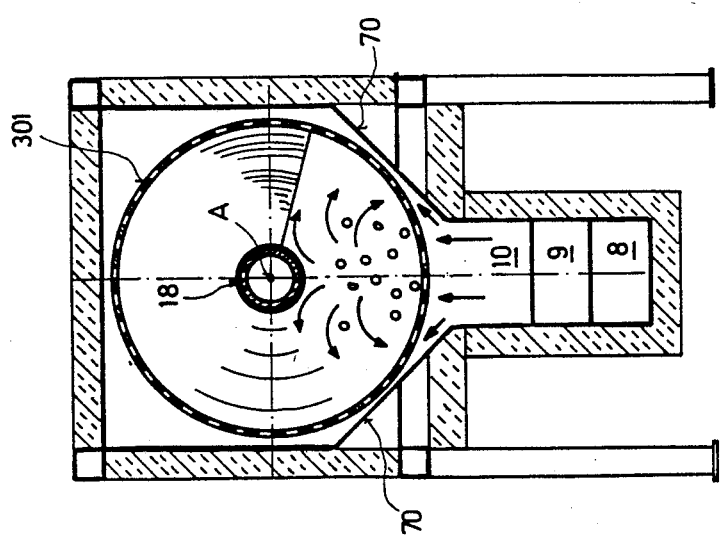

FIGS. 12 and 13 show a further embodiment in accordance with the invention in a representation similar to that of FIGS. 6 and 7.

In the preferred embodiment of FIGS. 1 to 3 a fluidised bed housing 1 is provided in the customary manner with a perforated base 2. In distinction however to the customary embodiment the housing 1 is rotatably mounted as a rotor. As can be seen from FIG. 2 the housing 1 has an approximately cylindrical projection 3 and roller bearings 4 engaged in known manner on the periphery of this cylindrical projection. Normally at least two rollers are arranged at the lower side on both sides of a vertical central plane, however it is expedient to also provide at least one roller bearing 4 at the upper side (as shown).

A drive shaft 5 is provided at the other end of the housing and is journalled in a bearing 6. The drive shaft 5 is driven to execute a preferably intermittent movement by a drive which will be described later in connection with FIG. 5.

Through the rotation of the rotor housing 1 the bulk material located therein will always be well mixed. In this way a non-uniform treatment of the bulk material resulting from the formation of dead zones is avoided.

Since the housing 1 has essentially the shape of a parallelepiped, as can in particular be seen from FIGS. 1 and 3, it is expedient to provide at least one further perforated wall 7. In the manner known per se from driers for dough products this further perforated wall is expediently the wall 7 located opposite to the floor 2 with respect to the axis of rotation. As will be explained later this is however not absolutely essential. However, the form shown in FIGS. 1 and 3 leads to an additional advantageous effect which will be explained in the following.

From FIG. 2 it can be seen that the treatment gas and optionally also different gases each supplied via one of three gas supply channels 8, 9, 10 is supplied to the sieve floor 2 of the rotor 1. An adjustment valve 11 in the form of a flap is respectively located in each of the gas supply channels 8, 9, 10. If desired, a valve of this kind can however also be omitted.

When the rotor illustrated in cross-section in FIG. 3 is located in the illustrated position then gas is supplied via each of the channels 8, 9, 10, passes through the sieve floor 2 and then ensures, as a result of the at least approximately 90° arrangement of imperforate sidewalls 12 of the rotor (see also FIG. 1 in relation to the sieve surfaces 2 and 7), a uniform depth of the bulk material in cross-section over the whole sieve surface. It will later be shown with respect to FIG. 4 that this condition cannot be observed with other cross-sectional shapes of the rotor 1. In principle the cross-sectional shape of the rotor 1 could also be rectangular and a uniform layer height of the material M would then also result over the cross-section of the rotor, however this will in general have unfavourable effects with regard to the rotation of the rotor housing 1 which takes place, which is why a square cross-section is preferred (as can be seen from FIG. 3).

Figure 3A:
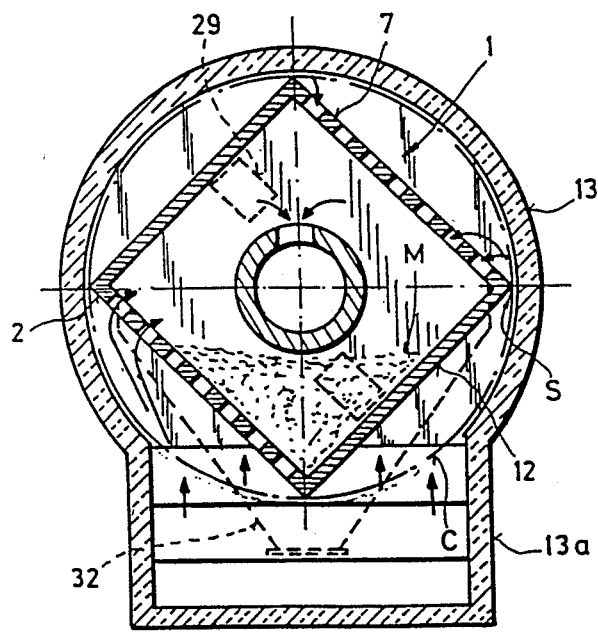
FIG. 3a shows the rotor having been turned through 45° relative to FIG. 3.

If now the rotor is turned then its edges move along an envelope circle C shown in chain-dotted lines in FIG. 3 (see also FIG. 2) into the position of FIG. 3a. During this two of its edges enter into a position in which they lie in a vertical plane V extending through the axis of rotation. On rotation of the rotor 1 in the clock-wise sense this signifies that the gas supplied via one of the channels 8 to 10 sweeps upwardly at the right hand side of a solid and now inclined sidewall 12. The gas supplied to the left hand side of the vertical plane V can admittedly at least partially likewise flow upwardly along the now inclined sieve surface 2, but will however at least partly penetrate through the sieve surface 2 where the bulk material M has left the sieve floor 2, and thus reduced the air resistance, after the bulk material fill M has slid downwardly as shown in FIG. 3a into the corner between the sieve floor and the imperforate sidewall 12.

Since the air flow sweeping along the sidewall 12 should expediently find an escape, it is advantageous for the rotor housing 1 to be dimensioned relative to the insulating housing 13 of fixed location which surrounds it in such a way that a corresponding gap S remains between the envelope circle C and the inner wall of the insulating housing 13. This measure also has the advantage, in a position of the rotor 1 in accordance with FIG. 3, that any gas eddies or reductions of the gas speed resulting along the inner wall of the approximately box-shaped lower part 13a of the insulating housing 13 no longer lead to non-uniform fluidisation of the bulk material M which is located at the walls 12. In practice it has been shown that the size of this gap S cannot simply be selected as desired. If namely, the gap S is too large then losses arise in that a part of the treatment gas is led past the bulk material without acting on it. If however the gap S is selected to be too small then the danger exists that the treatment gas does not fully sweep past the bulk material M in accordance with FIG. 3a but instead also flows through the edge of the bulk material contacting the sieve 2 and so produces non-uniform treatment. It has now been found that this air gap S is expediently dimensioned to be at least 3 mm, preferably a maximum of 20 mm and amounts in particular to 5 to 10 mm.

The fact that the fluidization of the bulk material M is now interrupted in the position of FIG. 3a means that a further heat transfer to this bulk material M is substantially omitted, i.e. the gas passes through without a substantial temperature loss to the bulk material M. During this time the individual particles of the bulk material M are left to the action of their own temperature with the cooling which takes place in accordance with an exponential curve being relatively small due to the environmental temperature. It is assumed here that in the fluidised bed shown a chemical reaction is carried out at an elevated temperature. However, the apparatus shown could naturally also be used for carrying out chemical and/or physical reactions at environmental temperature or for cooling purposes. Since many chemical reactions are however only expediently executable at a temperature above the environmental temperature the treatment medium preferably has a temperature above 110° C. and expediently above 200°. On the other hand the temperature of 450° should not generally be exceeded for practical reasons, with the preferred working range amounting to 230° C. to 420° C.

If now the thermal action is repeatedly interrupted by continuous rotation of the rotor housing 1 then the temperature within the bulk material M will be balanced out of its own accord which favours the uniformity of the reaction. It is admittedly known per se to carry out different reactions in two sequential thermal stages, however, the known process of this kind lacks the periodicity which is present here. This signifies that as a consequence of the continuous rotation of the rotor housing 1 at least three heating periods (generally however substantially more than this) and respective interruptions therebetween must be present. This periodically interrupted thermal treatment process is however not tied to the apparatus shown, since it would for example be conceivable to operate two or more fluidised beds in parallel and to thereby switch the supply of treatment gas repeatedly from one fluidised bed to the other.

It has now been found that many reactions surprisingly take place much more favourably with regard to their quality using such an intermittent process. One is admittedly also not bound when using such an apparatus to carry out an intermittent treatment method of this kind since, if desired, the sidewalls 12 could also be of perforated construction. With correspondingly narrow dimensioning of the gap S and also of the sieve holes the treatment gas would then be forced even in a position in accordance with FIG. 3a to flow through the bulk material M.

Numerous different embodiments can result in accordance with the above explanations simply in connection with the intermittent treatment. One such embodiment has already been described above. It is also be conceivable —related to FIG. 2—to control the flaps 11 such that the inflow of treatment gas is terminated in a position in accordance with FIG. 3a. This would however imply that the pressure would have to always be newly built-up again within the rotor housing 1, which is why it is more favourable to provide a flap 14 for the gas at the outlet side. With periodic closure of the flap 14 the latter would thus rotate synchronously with the rotor housing 1. It is however likewise conceivable for the flap 14 to be driven at a speed which is an integral multiple of the rotor speed in order to achieve a pulsation effect for the fluidised bed.

As can be seen from FIG. 2 the gas supply channels 8, 9 and 10 lead to corresponding compartments distributed over the length of the rotor housing 1. It would now be conceivable to rotate the arrangement of sieve surfaces 2, 7 and non-perforated sidewalls 12 in sequential compartments through respective amounts of 90° in the circumferential direction in such a way that in the illustration of FIG. 2 for example a sieve surface in one of the compartments would be followed by a non-perforated wall in the next adjacent compartment. In this case the flaps 11 could then be actuated so that the treatment gas is always respectively fed to the perforated wall so that flow energy can be conserved. In a case of this kind it is expedient to have an even number of compartments supplied from the gas supply passages. On the other hand it would also be likewise possible, in the case of interrupting the gas supply to one compartment, to open a non-illustrated by-pass duct in order to return the non-consumed gas in a circuit. Similar by-pass circuits have indeed already been proposed for the processing of batches.

In the specific embodiment shown in FIG. 2 the flap 14 is arranged adjoining a tubular manifold 15 which is connected via flange connections 16 with a gas discharge pipe 17 projecting into the interior of the rotary housing 1. This tube 17 primarily has the task of leading the gas supplied via the passages 8 to 10 out of the apparatus. For this function alone a simple gas flow would however be sufficient as will later be described with reference to FIGS. 6 and 7. For certain applications it can however be desirable, when the fluidised bed is to be provided with the sub-function of mixing (as described above) in addition to its function as a treatment apparatus, to also carry out a separating function since the airflow rising through the sieve wall 2 is suitable for the execution of a sifting action in the manner of a rising sifter. This is particularly expedient when the bulk material M is a heterogenous material which contains a fraction which is to be led away. The simple use of an extraction hood at the top side of the housing 13 would not be suitable for such a purpose.

When using the fluidized bed as a rising sifter it is expedient when the leading away of the inblown gas takes place at a position which is as high as possible. Moreover, the leading away of the gas should take place as uniformly as possible. For this purpose a plurality of extraction openings 18 are distributed over the length of the tube 17. A further opening 19 may be provided at the end face of the tube 17. In any event it is advantageous for the openings 18 to be arranged at the upper side of the tube 17 so that only the light fraction can enter there. Since the quantities of gas which now enter into the tube 17 via the openings 18 increases towards the tubular manifold 15 it is expedient, in order to keep the flow speeds in the region of the openings 18 constant, for the tube 17 to be conically constructed within the rotor housing 1 in the manner shown in FIG. 2.

Since the tube 17 is now of fixed location and the rotor 1 rotates about the tube 17 the tube could also be used for the journalling of the rotor 1. Since however, it is on the one hand desirable to relieve the tube 17 of mechanical loading simply having regard to its inherent weakness due to the openings 18, which can optionally be slit-like openings, and since the tube 17 is also conically shaped, the journalling via the tubular projection 3 and the rollers 4 is preferred.

As can be seen from FIG. 2 the tube 17 does not extend fully up to the opposite endwall of the rotor housing 1. This construction is admittedly not absolutely essential since the tube 17 can be made longer or shorter as desired.

The apparatus shown in FIGS. 1 to 3a would in principle also be suitable for batch operation, in which case the rotor housing 1 merely requires a filling opening at a suitable position from which the material can then also be removed. The fluidisation container 1 however preferably satisfies a further function for continuous operation. In order namely, to ensure a controllable dwell time of the material M within the rotating fluidisation container 1 a mechanical transport device is provided within the interior of the rotor 1. A transport device of this kind could have a drive shaft lying within the axle of rotation of the rotor 1, for example for a screw conveyor in similar manner to the construction of EP-OS 63 486. In this case the extraction could however hardly be brought about via a central tube 17 and one would probably have to turn to a circular form of the rotor 1 (in cross-section) It has however already been explained above why the illustrated square cross-sectional shape is particularly favourable. Accordingly, it is advantageous when the transport device is formed as a co-rotating screw approximately in the manner known from roasting drums.

Reference has already been made earlier to the different compartments within the rotor 1 which can be supplied via the different gas supply passages 8, 9, 10. With this arrangement it is straightforwardly possible and conceivable to provide different treatment zones, for example to supply different gases and/or gases at different temperatures via each of the passages 8 to 10. For this reason it is desirable for these gases also to be relatively well separated from one another within the rotor 1. This cannot however be realised with a screw having the form of a worm of regular pitch. For this reason one expediently turns to a worm arrangement such as is known per se from driers for dough products. In practice the worm construction to be described now amounts to a worm which has a varying pitch angle over one rotation, namely regions of rotation in which the pitch angle amounts to substantially 0° and in which therefore the wall of the worm forms a compartment within the rotor 1, whereas in other shorter regions, the worm wall has a relatively large pitch angle to execute a short and rapid transport from one compartment into the next. A preferred embodiment of such an irregular worm will now be described with reference to FIGS. 1 to 2.

The worm spirals to be used in the rotor 1 must naturally have a cross-section such as that of the rotor 1 itself, i.e. they must be formed as substantially four-cornered walls. This is best seen from FIGS. 1 and 1a. There the basic structure is shown with reference to the wall elements 20 and 21, however without the central cut-out necessary for the tube 17. In principle one could use exclusively walls 20 or 21 for a rotor 1 as is the case in the embodiment of FIGS. 6 and 7. The embodiment shown in FIGS. 1 and 1a however uses both wall types 20, 21 in order in this way to obtain a two-start worm.

In order to obtain a worm with a non-uniform pitch having one rotation in each case each wall element 20 and 21 has portions 22a, 22b which are arranged perpendicular to the rotors 2, 12 and 7 so that they have pitch of 0°. These wall sections 22a, 22b thus form the individual compartments within the rotor 1 as can be seen from FIG. 2. Since the wall section 22b of the next respective wall element 20 or 21 lies in the same plane as the section 22b of the adjacent wall element 20 or 21 of the same construction the two wall sections 22b which lie in one plane alongside one another result in a wall section which bridges the entire cross-section of the rotor 1 (similar to the wall section 22a). The wall elements 20 can thus be put together into a single uninterrupted screw flight in the same way as the wall elements 21 with the subdivision into individual elements facilitating the manufacture thereof.

The perpendicularly extending wall sections 22a, 22b are connected together via short oblique central sections 23 which bring about the transport of the bulk material from one compartment formed by the wall sections 22a, 22b to the next. In this way one obtains, on rotation of the fluidisation container 1, not only the mixing effect but instead additionally also a gentle transport of the bulk material. Moreover, this arrangement ensures that special compartments are formed which are strictly separated from one another in which the different respective treatment can be obtained via the gas supply passages 8 to 10.

One can also imagine this screw construction as being a stair-well construction tilted through 90° in which the individual storeys are arranged alongside one another instead of lying above one another. The floors of the storeys are then formed by the wall sections 22a, 22b whereas the sections 23 which connect them represent the steps between the individual storeys. In this way it will be understood that the construction shown can fundamentally be modified in any manner known from stair-well construction, however also in the manner known from the construction of driers for dough products.

Figure 1A:
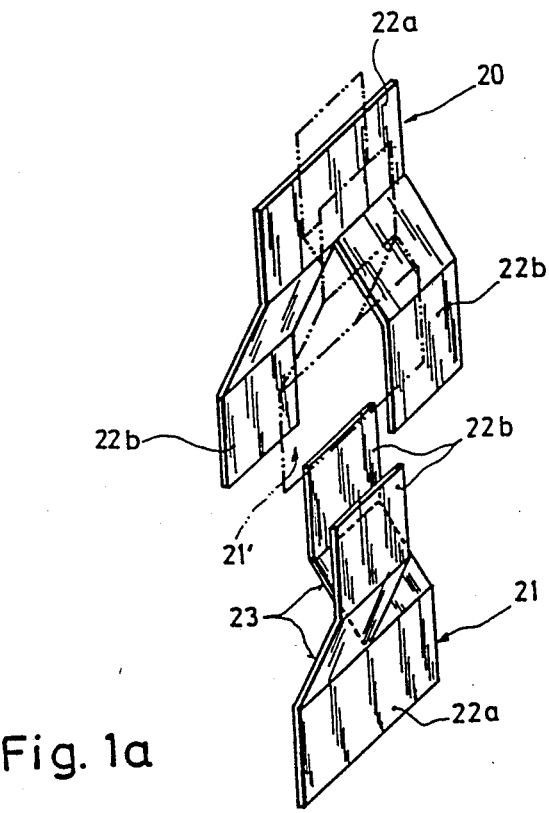

As can further be seen from FIGS. 1 and 1a the wall elements 20, 21 are symmetrically constructed with respect to a horizontal central plane. In order now to obtain a two-start screw these two wall elements 20, 21 are set inside one another so that the wall element 21 passes into a position 21' shown in FIG. 1a and so that the individual compartments within the rotor 1 (see FIG. 2) are formed alternately by wall sections 22a and 22b. As will later be seen from a comparison with FIG. 6 this has the advantage that the rotor 1 is always subdivided on each rotation at the same position in its interior. It will be understood that the arrangement in accordance with FIG. 2 has a plurality of the wall element pairs 20, 21 shown in FIG. 1a. It will likewise be understood that each of the gas supply passages 8 to 10 is expediently associated with an even number of compartments of the rotor 1, since otherwise the material in one of the screw turns would be submitted to a more intensive treatment than in the other screw turn. This can of course be entirely intended in exceptional cases, for example, if a different quality is to be generated at the same time in one of the screw turns. The filling of the compartments formed by the wall elements 20, 21 in the interior of the rotor 1 can in practice only take place intermittently. For this purpose the rotor 1 has a filling extension 24 (FIG. 2) which is led outwardly through the insulating housing 13 and which expediently rotates within an outer housing jacket 25. The filling extension 24 has two filling openings 26 disposed at 180° opposite to one another each of which lies opposite to a stationary filling stub 27 after a half rotation of the rotor 1. With this arrangement it may be advantageous if the filling extension 24 is of cylindrical construction since it is then easier to keep the filling stub 27 in sealed contact with the surface of the extension 24.

Since the filling can only take place intermittently, and since a precisely measured quantity of bulk material has to be added in order to ensure uniform treatment conditions within the rotor 1, it is expedient to arrange a volumetrically operating valve in the region of the filling stub 27, in particular in the form of a star feeder or bucket wheel lock 28. As an alternative the supply could take place via a tubular weighing scale or optionally also via a container weighing scale or a band weighing scale which controls a corresponding closure member or valve and shuts this valve (for example a gate valve) when a predetermined weight of the bulk material has been supplied.

The bulk material so supplied thus runs through the screw turns of the rotor 1 and then emerges at the outlet openings 29 (FIG. 1 of the rotor) which are shown in broken lines in FIGS. 3, 3a. These outlet openings 29 are covered over during the rotation of the rotor 1 by a wall 30 which is fixedly connected to the insulating housing 13 and which has a corresponding outlet opening 31 at its lower end which opens into an outlet stub 32.

In order to ensure a careful separation of the gases supplied via the gas supply passages 8 to 10 during the treatment of the bulk material M within the fluidisation container 1 (see FIG. 2) the rotor 1 is expediently provided with at least one partition wall 33 which is of disk-like construction and forms an extension of the spatially fixed partition walls 34 or passage walls of the passages 8 to 10. One of these rotating partition walls 33 is shown in FIG. 1. The gases which are generally of different temperature, can then leave the interior of the rotor 1 via the gas extraction tube 17, the manifold 15 and a tubular conduit or duct 35. When using the illustrated embodiment in the manner of a rising sifter a separator 26, for example a filter separator, or in particular a cyclone is expediently connected to this duct 35.

It should be evident from the above explanations that the rotation of the fluidisation container 1 can take place in principle uniformly and continuously by means of a customary drive via an electric motor, optionally also via a gear box. Of course this signifies that the charging via the individual passages 26 must then take place in the same period of time as that in which the passages move past the stubs 27. Furthermore, account must be taken of the fact that with a continuous drive the rotor 1 only adopts the position 3 in which the fluidisation takes place for a short time, so that the fluidisation is interrupted for a longer period of time between successive short periods of time. This will be sufficient for some applications, is however in many cases undesired. It has namely been found that it is on the one hand expedient when the duration of the treatment or the duration of the fluidization expediently lasts for 30 s to 300 s during an intermittent treatment, the interruptions in contrast should preferably occupy a shorter period of time. Admittedly with continuous drive a maximum of 300 s would likewise result, however these interruptions of the treatment should preferably amount to less than 30 s. Ideal conditions arise with interruptions between 2 s and 8 s.

In order to now obtain these drive conditions a continuous gearbox with a variable transmission ratio could in principle be used. However an intermittent drive is preferably used such as will now be described with reference to FIGS. 2 and 5. FIG. 5 corresponds in this respect to an end view in the sense of the line V—V of FIG. 2.

In principle it would be possible to omit the housing part 25 and to provide a drive via the extension 24 and its outer circumference. This would however have disadvantages for the sealing and would also bring the danger that abraded particles of the drive could enter into the passages 26 and thus contaminate the bulk material M. It is thus advantageous to provide the already mentioned drive shaft 5 on the extension 24 and to execute the journalling of the rotor 1 on the drive shaft 5 via fixed shaft bearings 6.

At least one ratchet wheel 39 is mounted on the drive shaft 5 and is connected with the drive shaft 5 via a follower ring 40 which is shrunk onto the latter. For reasons of symmetry of the forces which are effective it is however favourable for one ratchet wheel 39 to be arranged in the manner shown in FIG. 2 on both sides of the drive unit 41 shown in detail in FIG. 5. As the rotor 1 is to adopt the position of FIG. 3 for a relatively long period of time, and then in turn adopts a position rotated through 180° for a longer period of time, but must move relatively quickly through the intermediate positions (see FIG. 43a), the drive unit 41 of FIG. 5 can have two piston-in-cylinder units 41a, 41b which respectively drive the ratched wheel 39 and thus the shaft 5 after one another for a rotation through 90°.

It will be understood that the drive unit 42 remains stationary for a longer period during which the rotor 1 adopts the position of FIG. 3, whereupon drive units 41a are actuated for rotation through 90° thereafter the drive unit 41b for a further rotation through 90°. At the same time the star feeder 28 (FIG. 2) should be actuated in synchronism with this drive. The control for these drives can now be constructed in accordance with the block circuit diagram illustrated in FIG. 2.

It can be seen from the above explanations that the sequence of operation of the drive units 41a, 41b is expediently time-controlled and a clock oscillator 42 can be provided as a timing device. This clock oscillator 42 can itself either have a relatively low clock frequency it is however more expedient to allow the clock oscillator to run at a higher frequency and to connect a frequency divider 43 to it. A programme generator 44, for example a microprocessor, and in the simplest case a simple counter may be provided and controlled from these clock frequencies so that it provides a control pulse at its output after the passage of a predetermined number of clock pulses. This control pulse may, if desired, be passed to a pulse shaping stage 45 where it is brought to the respectively required duration. This pulse shaping stage 45 is expediently formed by a monoflop. The so shaped pulse is then passed to the solenoid 46 of a solenoid valve 47.

The solenoid valve 47 controls the flow and discharge respectively of two lines 48, 49 which respectively open into one end of the piston-in-cylinder unit 41a. This unit has a piston which can be energised with hydraulic medium from both sides. In the illustrated position of the solenoid valve 47 liquid is supplied with the aid of a pump P from a reservoir A to the line 48 with the discharge of the hydraulic medium being simultaneously ensured via the line 49.

If the solenoid 46 is energised then the valve 47 is displaced into a position in which the line 48 is connected with an output line 50 whereas a supply line 51 connected to the pump is connected with the line 49. In this case the piston of the unit 41a is thus moved out of the cylinder and thrusts the ratchet wheel 39 on for further rotation through 90° by means of a pin 52 which engages in the ratchet teeth of the ratchet wheel 39. A means known per se can optionally be provided for the ratchet drive which holds the ratchet wheel 39 in the respectively selected position.

An arrangement of this kind is also provided for the piston-in-cylinder aggregate 41b which contains parts (not shown) corresponding to the parts 45 to 52. The current circuit is of course connected to the associated pulse shaping stage for the unit 41b via a delay element 53, so that the unit 41b is first caused to execute a movement when the unit 41a has pushed the ratchet wheel 39 on through 90°.

A further delay element 54 may be connected to the output of the counter 44 in order to set the control circuit 56 for a motor 57 in action. The motor 57 drives the star feeder 28 for a predetermined time and thus supplies a predetermined quantity of material to be treated to the rotor 1. The control circuit receives its signal from the delay element 54 via a further pulse shaper stage 55.

It will be understood that the duration of the pulse transmitted by the stage 55 also determines the duration of rotation of the star feeder 28 with this duration being variable depending on the nature of the bulk material to be treated and the desired form of treatment. It is therefore expedient when the pulse former stage 55 is provided with an adjustment possibility 58. In the same way adjustment possibilities can be provided for the delay stages 53 and 54 which are symbolised here for the sake of simplicity as RC stages. Analogous comments apply to the pulse shaping stages 45 for the units 41a and 41b.

Even though a preferred form of realising the underlying concept of the invention has been shown in the above described embodiment, it will be understood that this concept can be modified in various ways. It will of course be at once clear with respect to the embodiment of FIG. 4 why the illustrated square cross-section of the rotor 1 is particularly preferred. In this FIG. 4, and also in all other modified embodiments, parts having the same function as those in FIGS. 1 to 3 are provided with the same reference numeral parts having a similar function are however provided with a hundred series number.

Thus, in accordance with FIG. 4a, the chain-dotted quadratic shape could be approximated to a circular cross-section by outward bowing of the walls 2, 7 and 12. A cross-section of this kind could be of particular interest when the gas extraction is not to take place in the interior of the rotor and the gas supply takes place intermittently in such a way that it is always interrupted when the gas supply passages lie opposite to one of the imperforate sidewalls 12. It can however also be readily seen from the representation that the bulk material at the floor of the sieve 2 will have a non-uniform height over the cross-section, i.e. it will be less at the edges than in the middle. In this case it will also be expedient to execute a certain degree of through-mixing with the aid of a fluidizing gas, i.e. to exploit the inclined portions of the sieve floor 2 which rise upwardly at both sides to cause the material to slide from the side towards the center where it is blown upwards and outwardly by an increased air current. It will however also be understood that this is associated with increase flow speeds and quantities of gas which signifies a higher consumption of energy. The non-uniformity in the height of the layer can admittedly be partly compensated for by the fact that the rest periods for the sieve floor 2 can be made shorter and the rotor 1 can be more frequently turned for better through-mixing. This however also again leads to a higher energy consumption.

With a triangular cross-section in accordance with FIG. 4b the fluidisation is hindered at the corners of the rotor between the sieve floor 2 and the sidewalls 12, to which must be added the fact that the volume of a cross-sectional shape of this kind is reduced in relation to its circumference—in comparison to the square cross-sectional shape of FIGS. 1 to 3. It would indeed be conceivable to provide perforated walls only in the edge region of such a cross-sectional shape as is shown for the sieve surface 7. A measure of this kind is however again associated with extremely different layer heights of the bulk material and these different layer heights can also lead to different flow resistance.

A hexagonal cross-section in accordance with FIG. 4c would be better than the triangular cross-section of FIG. 4b. It is however also evident here that a polygonal cross-section of this kind necessarily leads to the material layer being deposited so that it always becomes thinner towards the edges at the outside at the imperforate sidewalls. In the event of a desired thermal reaction caused by the supply of heated gas or air the sidewalls are now however also heated up and thus transmit contact heat to the material layer which is in direct contact therewith, whereas each adjacent layer receives less heat. This would also lead to non-uniform treatment which could in turn only be compensated for by measures such as were discussed with reference to FIG. 4a. On the other hand all the cross-sections which have been shown are still more favourable than a cylindrical cross-section, since with a cylindrical cross-section the danger exists that the material will simply slide along the walls during rotation, without mixing occurring. The material abrasion which occurs during sliding at the walls representing an additional disadvantage. To this extent any cross-section which deviates from the cylindrical shape brings a greater advantage.

A simplified embodiment will now be described with reference to FIGS. 6 and 7. In this embodiment a rotor 101 is accommodated in a housing 113 which can in principle be constructed analogously to the housing 13 but which is however distinguished from the latter by an extraction hood 59 arranged at the top side. Thus the treatment gas supplied via passages 8, 9 passes through the rotor 101 and is in large part drawn off again at the extraction hood 59. An extraction tube 117 can however also be provided in accordance with the previously described embodiment with slot openings 18 in order to be able to effect the separating function discussed with reference to FIGS. 2 and 3 for separating a lighter fraction out of the bulk material filled into the fluidisation container 101. In this case the tube 117 can be connected to the duct 35 and to a separator 36 analogously to the previously discussed embodiment (see FIG. 2).

On the other hand it is however also possible to execute the part 117 as a throughgoing shaft in order to drive the rotor 101 via this shaft. In this arrangement the cylindrical shape of uniform diameter of the part 117 makes it possible to connect a further rotor 201 directly onto the rotor 101, if it is desired to connect several treatment stages in series. In this case the housing 113 is then made correspondingly larger in order to surround the two rotors 101, 201. However, two housings 113 can also be connected together while omitting the partition wall. In this way a modular construction can be achieved in the same manner as is described in EP-OS 142 652 for a drum dryer.

The rotor 101 illustrated in FIG. 6 has only a single screw flight of irregular pitch which is put together practically only of wall elements 20 (see FIG. 1). In the plane of the wall element 22b the section 22b of one element thus lies behind the section 22b of the neighbouring element. If the air supply passages 8, 9 are now separated from one another by an intermediate wall 60 then this intermediate wall 60 will end in the vertical plane of the rotor disk 33 (see FIG. 1). However, this disk 33 lies in the plane of the wall section 22b at the lower side of the rotor 101 whereas a corresponding wall section which separates of the compartment is missing at the top side. Accordingly a transition climate will form in the compartment 61 of the rotor 101, i.e. it is supplied on each rotation with treatment gas, for example treatment gases at different temperatures, from the two passages 8, 9. Thus, if one wishes to avoid such transition compartments 61 a two-start screw should be used in accordance with the previously described embodiment.

As seen in cross-section (FIG. 7) it may be expedient to provide the housing 113 with sealing walls 62 and also with a projection 63 of approximately triangular cross-section in order to prevent the gas flow being led past the sieve floor 2. It has however already been explained with reference to the embodiment of FIGS. 1 to 3 that a seal of this kind is not only not required but rather that a certain air gap S can indeed be of advantage. If one now wishes to combine the flow advantages of a conical extraction tube 17 in accordance with FIG. 2 with those of a cylindrical extraction tube 117 (possibility of modular assembly, possibility of journalling the rotor on the cylinder body) then a stepped cylindrical body 217 can be used in accordance with FIG. 8. If a further rotor 201 is then to be mounted following the rotor 101 then it is conceivable to premanufacture rotor units as shown in FIG. 1 but to make their endwalls 64 (FIG. 1) in the form of the endwalls 164 of FIG. 9. Here the endwall 164 has an opening 65 corresponding to the largest diameter of the tube 117 in accordance with FIG. 8 which can, as required, simply be closed by an adapter plate or two half adapter plates 66 corresponding to the tube diameter which is to be provided.

A further variant is shown in FIG. 10 with respect to an illustration of the rotor 301 similar to that of FIG. 1. In this representation the imperforate sidewalls 12 are formed as double walls, i.e. arched sidewalls 112 are provided at its inner side. These arched sidewalls 112 screen the bulk material located inside the rotor 101 from any form of contact heat from the walls 12, on the other hand, they can also be used for the sucking off of a light fraction.

For this purpose one can provide at least one row of extraction slots 118 in the region of the upper side of these inner walls 112 with the extraction slots 118 corresponding to the openings 18 of the extraction tube in FIG. 2. The sucking off of this fraction can now take place on each rotation of the rotor 301 in that the inner space formed between the walls 12 and 112 is aligned with an extraction tube 317, the opening of which is expediently constructed (deviating from the illustration of FIG. 10) so that it embraces the entire space disposed between the walls 12 and 112.

It will be understood that on each rotation of the rotor 301 the inner walls are turned through 180° so that the row of extraction slots 118 which is uppermost passes into the position 118' on the other side. This will in general not be associated with any particularly disadvantageous consequences provided only a single extraction tube 217 is associated with that side of the rotor 301 at which the elongate holes 118 are upwardly disposed. If necessary, a light excess pressure can however be applied to the double wall with the downwardly disposed slot holes 118 (via a tube similar to the tube 317) with this excess pressure indeed being able to promote the mixing of the bulk material. Another variant could lie in forming the slots 118, with corresponding dimensioning of the rotor 1 and of the gas supply, in the central region of the inner walls 112.

It will however also be understood that independently of whether a slot 118 and a suction tube 317 are provided, or not, the arrangement of double-sidewalls 12, 112 can be of advantage. In this arrangement it is also not absolutely essential to form the inner walls 112 with a curved shape, on the contrary these could also extend parallel to the outer walls 12.

It was initially already mentioned that the different moisture content of the individual particles of the bulk material to be treated can be a cause of different treatment results. In a plant with an apparatus in accordance with one of the previously described embodiments it is thus expedient to arrange a conditioning device before the apparatus in order to make the moisture content of the particles of the bulk material more uniform. In the plant shown in FIG. 11 an apparatus A is now used in accordance with FIG. 2 with a fluidized bed B being provided before it. Now the drying in a fluidised bed is relatively expensive energy-wise and only leads to the desired uniform result with a long and gentle treatment as a result of the different actions of the fluidised bed on dry and moist particles.

It has now been found that the moisture of particles with a higher moisture content can be selectively driven out from these particles, in particularly favourable manner if the fluidised bed B is connected to a microwave generator 67. This microwave generator need only be formed with a low output power since it is not intended to bring about any change of the particles of the bulk material through the thermal treatment which it carries out. The purpose of the microwave generator 67 is solely to drive the moisture present in the interior of the particles of the bulk material outwardly, where it can be led away by the air or gas stream supplied via the sieve floor 102 of the fluidised bed B. In practice it has been shown that a particularly good uniformity of the moisture content can be obtained in this way which is a precondition for a uniform treatment in the apparatus A. It is evident that with a combination of the apparatuses A and B of this kind a single lock 28 can be common to both apparatuses A and B. This lock 28 then brings about, on the one hand, an air-tight closure relative to the fluidised bed B and, on the other hand, the desired feed to the fluidised bed A. Naturally, a further fluidised bed with a construction corresponding to that of the apparatus A can be used in place of the fluidised bed B. In this case the apparatus A should be connected with a microwave generator corresponding to the generator 67 in such a way that the microwave field is generated in the interior of the rotor 1.

In the case of a thermal treatment a belt cooler C can then be provided following the outlet stub 32 of the apparatus A. With the aid of this belt cooler the thermal action on the bulk material can be rapidly terminated in that cold air is drawn through the bulk material moving through the belt cooler via its extraction hood 68.

Even though only the supply passages 8 to 10 and the extraction tubes have been described in the context of the above description as gas supply and extraction devices, it will be understood that corresponding fans must be associated with these passages and tubes with the fans being adequately dimensioned for the fluidisation of the bulk material.

FIGS. 12 and 13 are intended to show that a cylindrical fluidization container can also be used under favourable conditions and for some applications. When namely, in accordance with FIG. 12 the gas supply passage or passages 8, 9, 10 have a restricted cross-section relative to the container 301—as seen in a cross-section through the rotational axis A of the fluidisation container—then an increased flow speed arises in the region of these passages 8 to 10 even with a low gas volume. With this increased flow speed the gas now enters into the fluidisation container 301 and there creates a fluidised bed. I.e. a pneumatic mixing is obtained (without having to convey a large gas volume) which is why the mechanical through-mixing by means of a container cross-section which differs from a circular cross-section is not absolutely essential.

This fluidized bed effect is further assisted by the fact that the sidewalls 70 extend obliquely outwardly tangential to the circumference of the container and thus provide a zone in which the material being treated can also move downwardly again towards the sieve cylinder. As can be seen from FIG. 13 the passages 8 to 10 thereby extend in the axial direction, in each case over essentially the full length of the associated section, so that no form of dead zones arise.

Therefore, although the gas speed rapidly slows down in the interior of the fluidisation container, this is sufficient with the correct adjustment for the lighter components such as separated shells to eddy upwards above the fluidized bed. There these light components however enter into the region of a relatively pronounced suction brought about by the narrow slots 18, so that the shells are removed relatively rapidly and reliably. Thus here an interplay of rapid and slow gas movements leads to a particularly effective combination effect.

With reference to the fluidization container a helical screw 120 is shown (i.e. a screw with uniform pitch) however, it will be understood that it is more advantageous to use one of the previously described screw constructions (one or two-start threads).

Various modifications are possible in the context of the invention. Thus it is naturally not necessary to provide a hydraulic ratchet drive, on the contrary the ratchet drive shown in FIG. 5 can also be actuated pneumatically. In other respects purely mechanical ratchet drives would also be conceivable. Furthermore, it will be understood that the treatment time is largely influenced by the rotation of the fluidization container 1 or 101. It will therefore be expedient to provide the clock generator 42 (FIG. 2) which determines the period of rotation through its frequency with an adjustment device 70 in order to be able to change the rotation or speed of the fluidisation container 1. Of course numerous other possibilities are also present, for example the possibility of adjusting the step down ratio of the frequency divider 43 and/or of correspondingly switching over the output line of the counter 44. If desired, all three measures can be simultaneously realised in order to obtain a larger adjustment range.

It has already been mentioned that the rotor could be continuously driven and it was indicated why this is less advantageous than an intermittent drive. The latter drive must not necessarily be formed by a ratchet drive. On the contrary position transducers on the rotor could control an electric motor—in the manner of a lift or elevator control—in order to stop in each case for the desired period of time in the position shown in FIG. 3. Other stepping drives would also be conceivable.

With the aid of the apparatus of the invention all physical and/or chemical treatments can be carried out which are customarily carried out in fluidised beds. In particular the apparatus of the invention is suitable where a very gentle and uniform treatment is required, for example with difficult materials in which the Maillard reaction is to be carried out. The further application can be the cooling of bulk materials where, for example in an apparatus in accordance with the invention (for example in the rotor 101) a heating of the material is first to take place and then a cooling thereof in a subsequent apparatus connected with the first (for example in the rotor 201). Because however the individual compartments are readily divisible from one another by the wall elements 20, 21, adjacent compartments can also be exploited for carrying out different treatments.

We claim:

1. A method for treating bulk material by means of a gas, the method comprising the steps of
   introducing the bulk material to be treated into a container having at least one wall being at least partially perforated;
   causing the gas to flow through the at least partially perforated wall of the container to provoke a fluidization of the material;
   rotating the container about an axis.

2. A method in accordance with claim 1 wherein the fluidization is interrupted at periodic intervals.

3. A method in accordance with claim 1, characterized in that the fluidizing gas has a flow velocity of 1 to 3 m/s.

4. A method in accordance with claim 1, characterised in that a fluidising gas has a pressure difference between the inner and outer side of the container of 40 to 60 mm of water column.

5. A method in accordance with claim 2, wherein the bulk material is left to the action of the energy stored in it during at least three heating periods between which intermediate interruptions are provided.

6. A method in accordance with claim 5, characterized in that the heating periods are longer than the interruptions.

7. A method in accordance with claim 5, characterized in that the heating periods in which thermal energy is supplied to the interior of the bulk material being treated, in particular by the flow therethrough of a gaseous heat carrier, lasts for 10 to 300 s.

8. A method in accordance with claim 5, characterized in that the interruptions during which the supply of thermal energy to the interior of the bulk material being treated is terminated lasts for a maximum of 300 s.

9. A method in accordance with claim 5, characterized in that the elevated temperature of the treatment medium, which is a gaseous treatment medium, lies above 110°.

10. Apparatus for treating bulk material by means of a gas, the apparatus comprising:
    wall means forming a container of a cross-section which deviates from a circular cross-sectional shape and has a geometrical axis, said wall means being perforated at least in part;
    drive means for rotating said container about its axis;
    supply and discharge means for allowing material to be supplied into said container and to be discharged from it;
    gas supply and discharge means to conduct said gas through said wall means perforated at least in part, said gas supply and discharge means being dimensioned with respect to pressure and speed of gas flow as to fluidize said material within said container.

11. Apparatus in accordance with claim 10, wherein said wall means comprise walls which are at least approximately perpendicular to one another.

12. Apparatus in accordance with claim 10 wherein the jacket wall of the rotating fluidization container is perforated at opposite sides relative to the axis of rotation.

13. Apparatus in accordance with claim 10, wherein an air gap (S) is provided between the envelope circle (C) of the rotating fluidisation container and the inner wall of the housing.

14. Apparatus in accordance with claim 13, wherein the air gap (S) amounts to at least 3 mm.

15. Apparatus in accordance with claim 10, wherein the drive for the rotating fluidisation container is an intermittent drive.

16. Apparatus in accordance with claim 15, wherein the intermittent drive for the container having an at least partially perforated jacket wall comprises a ratchet drive, in particular with fluid actuation via a piston-in-cylinder unit.

17. Apparatus in accordance with claim 10, wherein the gas discharge means has a gas extraction duct provided with a valve, in particular a flap valve.

18. Apparatus in accordance with claim 10, wherein the gas discharge means comprises a gas extraction duct which projects into the interior of the fluidization container and is in particular provided with at least one extraction opening extending coaxially to the axis of rotation.

19. Apparatus in accordance with claim 18, wherein a number of extraction openings is distributed over the length of the gas extraction duct, in particular is uniformly distributed thereover.

20. Apparatus in accordance with claim 19, wherein the extraction openings distributed over the length of the gas extraction duct are provided at the upper side of the gas extraction duct.

21. Apparatus in accordance with claim 18, wherein the gas extraction duct which extends coaxial to the axis of rotation has a larger diameter at the point of its emergence at one end of the container that at the opposite end in the interior of the container.

22. Apparatus in accordance with claim 21, wherein the gas extraction duct is of conical shape.

23. Apparatus in accordance with claim 10, wherein the rotatable fluidisation container is supported by positioning rollers at least one peripheral surface thereof.

24. Apparatus in accordance with claim 10, wherein a transport means for the bulk material is provided in the interior of the rotatable fluidisation container, and is in particular constructed as a co-rotating worm screw.

25. Apparatus in accordance with claim 24, wherein the screw has an irregular pitch over each turn, with compartments for the bulk material being formed by sections with a pitch angle of at least approximately 0°, whereas the sections with a larger pitch angle are provided for the further transport into the next compartment.

26. Apparatus in accordance with claim 10, wherein a synchronising means is provided for synchronising the drive of the fluidisation container, which is preferably adjustable via an adjustment means, and a material supply means, with said drive preferably being formed as an intermittent drive.

27. Apparatus in accordance with claim 10, further comprising microwave generator for generating a microwave field in the interior of the rotating fluidisation container.

28. Apparatus for treating bulk material by means of a gas, the apparatus comprising:
wall means forming a container of a cross-section which deviates from a circular cross-sectional shape, said wall means being perforated at least in part;
supply and discharge means for allowing material to be supplied into said container and to be discharged from it;
gas supply and discharge means to conduct said gas through said wall means perforated at least in part, said gas supply and discharge means being dimensioned with respect to pressure and speed of gas flow as to fluidize said material within said container;
transport means for the bulk material provided in the interior of the rotatable fluidization container; and
wherein the transport means is formed as a two-start worm screw.

29. Apparatus in accordance with claim 10, further comprising a conditioning means inserted before the container rotating about an axle, in particular to render the water content of the bulk material particles more uniform.

30. Apparatus in accordance with claim 29, wherein the conditioning means comprises a combination of a gas supply means with a microwave generator for generating a microwave field inside a region of the gas stream from said gas supply means.

31. Apparatus in accordance with claim 30, wherein the conditioning means is also provided with a rotating fluidisation container.

32. Apparatus in accordance with claim 11, wherein said wall means form a square cross-section of said container.

33. Apparatus according to claim 12, wherein the jacket wall has at least one imperforate wall and in particular two imperforate walls.

34. Apparatus according to claim 13, wherein the rotating fluidization container is rotatable in an insulating housing to which the treatment gas can be supplied.

35. Apparatus according to claim 13, wherein the air gap has a maximum value of 20 millimeters.

36. Apparatus according to claim 13, wherein the air gap has a range of 5 to 10 millimeters.

37. The method in accordance with the claim 5, characterised in that the interruptions during which the supply of thermal energy to the interior of the bulk material being treated is terminated last for less than 30 s.

38. The method in accordance with claim 5, characterized in that the interruptions during which the supply of thermal energy to the interior of the bulk material being treated is terminated last for from 2 s to 8 s.

39. The method in accordance with claim 5 characterised in that the elevated temperature of the gaseous treatment medium is above 150° C.

40. The method in accordance with claim 5 characterized in that the elevated temperature of the gaseous treatment medium is at a maximum of 450° C.

41. The method in accordance with claim 5 characterized in that the elevated temperature of the gaseous medium lies in the range of 160° C. to 420 °0 C.

* * * * *